Dec. 21, 1965 R. L. WEIR 3,224,269
DEVICE FOR INDICATING WIND DIRECTION
AND MEASURING WIND SPEED
Filed June 12, 1962 2 Sheets-Sheet 1
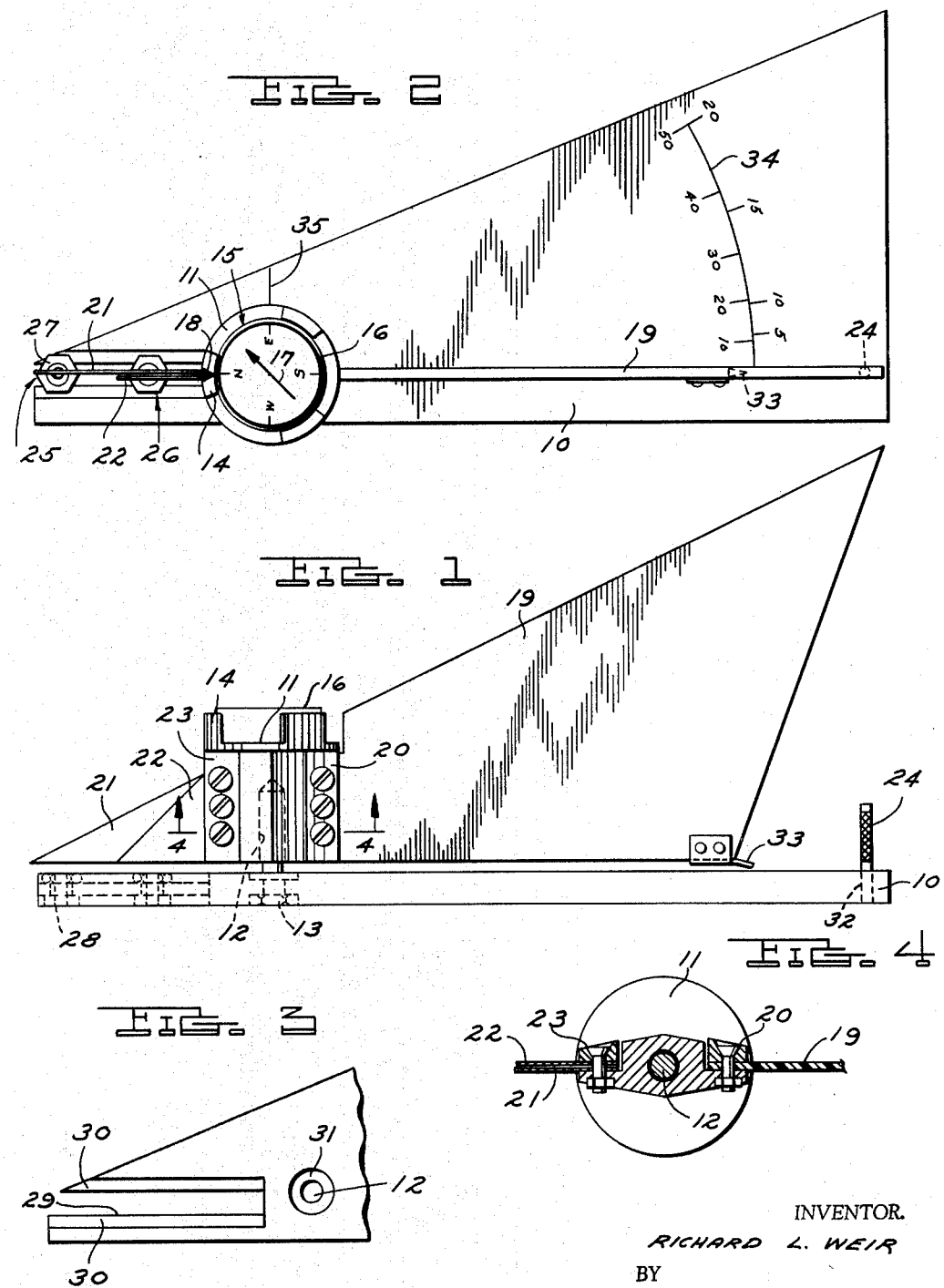
INVENTOR.
RICHARD L. WEIR
BY
ATTORNEYS

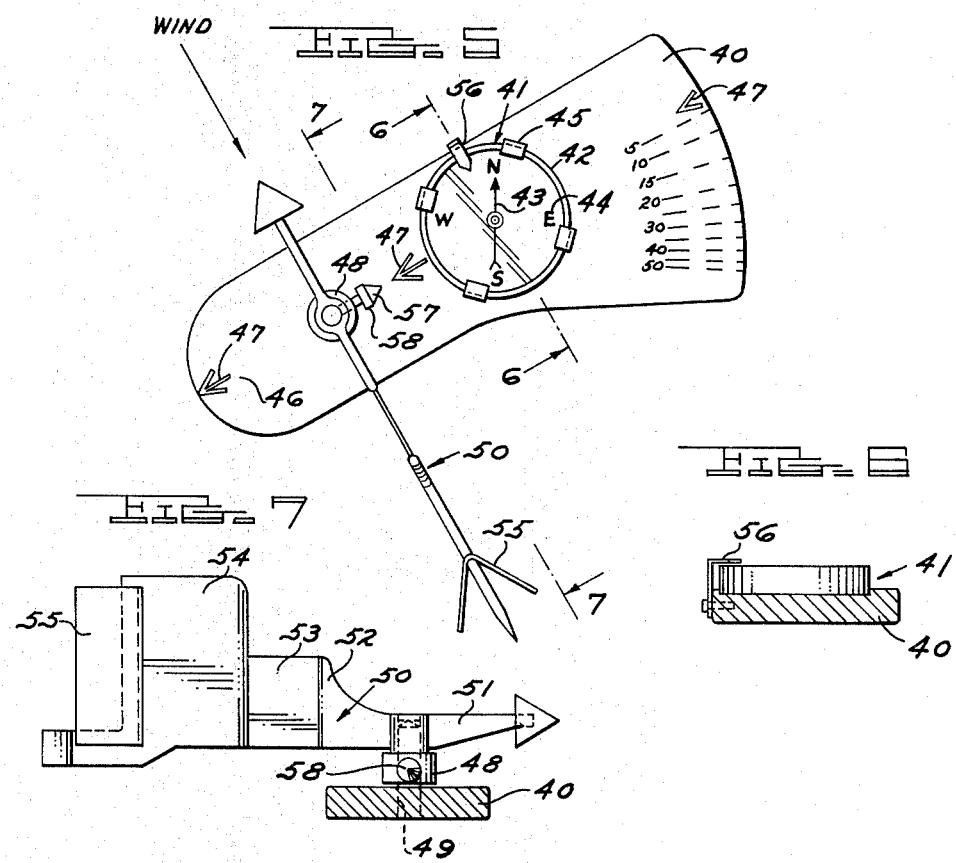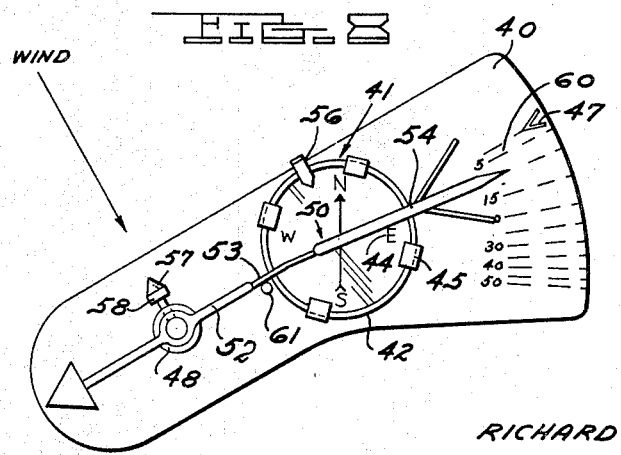

United States Patent Office 3,224,269
Patented Dec. 21, 1965

3,224,269
DEVICE FOR INDICATING WIND DIRECTION
AND MEASURING WIND SPEED
Richard L. Weir, % Weir Development Co.,
70 Sinclair Ave., Dayton, Ohio
Filed June 12, 1962, Ser. No. 201,834
5 Claims. (Cl. 73—189)

This invention relates to a device for indicating wind direction and measuring wind speed and particularly to such a device that is readily portable and easy to use.

It is an object of the invention to provide a device for indicating wind direction and measuring wind speed which is light weight and portable; which is easy to use; which involves a minimum number of parts; and which can be manufactured at low cost.

Basically, the device embodying the invention comprises a base, a compass and a wind vane. The compass is of conventional construction including a compass casing and a compass needle. The compass casing is mounted on the base so that the casing is rotatable about a vertical axis. The wind vane is also mounted on the base for rotation about a vertical axis. Indicia means are provided in cooperation with the compass to indicate the wind direction. A portion of the wind vane is made flexible so that when the wind vane is turned in such a manner that it extends transversely of the wind, and a portion of the wind vane if fixed relative to the base, the wind vane will flex in accordance with the magnitude of the wind. Indicia on the base cooperating with a wind vane can then be used to indicate the wind speed directly.

In the drawings:

FIG. 1 is a side elevation of a device embodying the invention.

FIG. 2 is a plan view of the same.

FIG. 3 is a fragmentary plan view of a portion of the base of the device.

FIG. 4 is a sectional view taken along the line 4—4 in FIG. 1.

FIG. 5 is a plan view of a modified form of device embodying the invention

FIG. 6 is a sectional view taken along the line 6—6 in FIG. 5.

FIG. 7 is a sectional view taken along the line 7—7 in FIG. 5.

FIG. 8 is a plan view similar to FIG. 5 showing the arrangement of the parts for measuring wind speed.

Referring to FIGS. 1 and 2, the device for indicating wind direction and measuring wind speed comprises a base 10 which is generally in the form of a right triangle. A pivot block 11 is mounted on a pivot pin 12 fixed on the base 10 by a nut 13 and extending upwardly above the base. The top of the pivot block 11 is flat and includes upwardly extending peripheral lugs 14 which support a compass 15. The compass 15 is of conventional construction and includes a casing 16 and a needle 17 that swings about an axis coincident with the axis of the pin 12. One of the lugs 14 is formed with an index mark 18. A rigid wind vane 19 is mounted on the pivot block 11 by a lock plate 20 and extends generally radially outwardly therefrom and vertically thereof. Aligned sheet metal springs 21, 22 are mounted on pivot block 11 by a lock plate 23 and extend generally radially and diametrically upwardly relative to the pivot block and in alignment with the vane 19. A spring stop pin 24 is selectively positioned in one of the two positioning assemblies 25, 26 so that it engages either spring 21 or spring 22, respectively, as presently described. Each stop assembly 25, 26 comprises a nut 27 into which a hollow bolt 28 is threaded. The spring stop pin 24 is inserted into the hollow bolt.

As shown in FIG. 3, the stop assemblies 25, 26 are adjustably positioned radially of the base in a slot 29 the sides of which are flanged as at 30. As shown in FIG. 3, the longitudinal axis of slot 29 is spaced from the axis 31 of the pin 12. This is to accommodate for the diameter of the spring stop pin 24. As shown in FIG. 1, the spring stop pin is stored in an opening 32 when not in use. An indicator member 33 on the rear end of the vane cooperates with a scale 34 on the top surface of the base. The scale 34 is calibrated on one side, scale A, to indicate the wind speed when the stop pin is in positioning assembly 25 and on the other side, scale B, when the stop pin is in positioning assembly 26.

In operation, the device is held in the hand or placed on any flat, relatively level surface which is exposed to the wind flow to be located and measured. With the spring stop pin 24 in its stored position in opening 32, the wind vane will turn under the action of the wind and assume a direction parallel to the direction of the wind. If then the compass casing 16 is rotated to bring the indicia of the compass casing representing north into alignment with the compass needle 17, the indicator mark will indicate wind direction directly. In this manner, the device can be used to readily determine the direction of wind flow.

In order to determine wind speed, the base 10 is rotated until a scribe mark 35 on the base, which is at 90° to the axis of the slot 29, is brought into alignment with the axis of the vane as it is held by the wind. The vane 19 is then grasped manually and rotated to bring it at 90° to the direction of the wind, spring stop pin 24 is inserted in one of the assemblies 25, 26 and the vane 19 is released. The wind will cause the vane 19 and, in turn, the pivot block to swing flexing one or both the spring 21, 22 depending upon whether the spring stop pin 24 has been positioned in positioning assembly 25 or 26. The alignment of the indicator 33 with one or more of the numbers of the scale 34 can then be read to indicate wind speed directly.

Where the wind speed is substantial, spring stop pin 24 is positioned in assembly 26 so that both of the springs 21, 22 will oppose the movement of the vane. Where the wind speed is of lesser magnitude, spring stop pin 24 is inserted in positioning assembly 25 so that only the spring 21 will oppose movement of the vane.

A modified form of device for indicating wind direction and measuring wind speed is shown in FIGS. 5–8. As shown in FIG. 5, the device comprises a base 40. A compass 41 is partially recessed within the top of the base 40. The compass 41 is of conventional construction and comprises a casing 42, a needle 43 and indicia 44. As shown in the drawing, the compass is held in position by flanged lugs 45. A reference line 46 is provided on the top of the base 40 and indicated by arrows 47, the reference line 46 intersects the axis of the needle 43. A collar 48 is rotatably mounted on a pin 49 fixed in the base 40 and extending upwardly therefrom. A wind vane 50 is fixed on the collar 48 and includes a first portion 51 extending radially in one direction, a second portion 52 extending radially in the opposite direction, a third portion 53 which is made of flexible material extending radially outwardly and rearwardly from the second portion 52 and a fourth relatively rigid portion 54 extending radially outwardly from the flexible section 53. In order to increase the surface of the vane, laterally extending wings 55 may be provided thereon. A reference mark 56 is provided adjacent the periphery of the compass 41 at an accurately determined right angle to the reference line 46 (FIGS. 5 and 6).

In operation, the device is held in the hand or placed on a flat, relatively level surface which is exposed to the wind flow to be measured. The vane 50 will assume a direction parallel to the direction of wind flow. The base 40 is then rotated until a point 57 on a knurled screw 58 threaded into the collar 48 in such a manner that the point is at right angles to the vane coincides with reference line 46. The compass casing 42 is then rotated until the needle 43 coincides with north of the compass indicia 44. The direction of wind flow is then clearly shown by reference to the mark 56.

To determine the wind speed, the vane 50 is rotated 90° counterclockwise so that the arrowheads 47 on the reference line 46 and the forward end of the vane 51 coincide. Lock screw 58 is tightened. This brings the weather vane transverse to the direction of wind flow and the flexible portion 53 of the wind vane will flex permitting the rear portion 54 to assume an angular position realtive to the forward portion 51 and overlie a scale 60 scribed in the top surface of the base. The scale may contain several sets of calibrations depending on the varying magnitudes of wind speed and an adjustable stop 61 can be provided on the base 40 to vary the length of the flexible portion 53 thus providing a large range of flexibility permitting the device to be used for measuring a wide range of wind speeds.

It can thus be seen there has been provided a device for determining wind location and measuring wind speed which is simple, inexpensive, easy to use and incorporates a minimum number of parts.

I claim:

1. In a device for indicating wind direction and measuring wind speed, the combination comprising
   a base,
   a conventional compass including a compass casing, a compass needle mounted in said casing for rotation about a generally vertical axis, and directional indicia means on said compass casing,
   means for mounting said casing for rotation relative to said base so that the casing can be rotated about the vertical axis of the needle,
   a wind vane,
   means for pivotally supporting said wind vane on said base for movement about a vertical axis,
   indicia means related to said directional indicia means on the casing for rotating the casing to orient the casing relative to the direction of the vane so that when the casing is oriented relative to the direction of the vane, the compass needle will indicate the compass direction,
   means for selectively rigidly fixing a portion of said vane on said base,
   a portion of said vane being adapted to be flexed when moved in a direction at an angle to the direction of the wind,
   and wind velocity indicia means on said base adapted to indicated the velocity of the wind depending of the flexing of the vane.

2. In a device for indicating wind direction and measuring wind speed, the combination comprising
   a base,
   a pivot member pivoted to said base about a generally vertical axis,
   a conventional compass including a compass casing, a compass needle mounted in said casing, and directional indicia on said casing,
   means for mounting said compass casing on said pivot member for rotation with said pivot member about the pivotal axis of said pivot member,
   a wind vane fixed to said pivot member and extending generally vertically and radially therefrom,
   indicia means on said pivot member cooperating with said directional indicia on said compass casing,
   said compass casing being rotatable relative to said pivot member for changing the relative relationship of said indicia means on said pivot member and said directional indicia on said compass casing,
   a flexible sheet metal spring fixed to said pivot member and extending generally vertically of said base and radially of said pivot axis,
   removable stop means on said base adapted to be engaged by said spring when said vane is at an angle to the direction of the wind and wind pressure acts on said vane,
   and indicia means on said base and cooperating with said wind vane to indicate the velocity of the wind depending upon the flexing of said spring by wind pressure on said vane.

3. The combination set forth in claim 2 wherein
   said stop means is adjusted radially of said pivot axis to various positions to set the spring force on said vane,
   said indicia means on said base having plural readings so that a set of indicia means can be associated with each of said radial positions of said stop means.

4. The comibnation set forth in claim 2 wherein said spring comprises
   a plurality of sheet metal springs,
   one spring extending radially beyond the other,
   said stop means being adjustably positioned to various positions generally radially of said base to vary the spring force applied to oppose movement of said vane by wind pressure,
   said indicia means on said base having plural readings so that a set of indicia means can be associated with each of said radial positions of said stop means.

5. In a device for indicating wind direction and measuring wind speed, the combination comprising
   a base,
   a conventional compass including a compass casing, a compass needle mounted in said casing and directional indicia on said casing,
   means for rotatably mounting said casing on said base so that the casing is rotatable about the axis of the needle,
   a wind vane,
   means for supporting said wind vane on said base for rotation about an axis parallel to the axis of said needle,
   indicia means on said base for orienting said base relative to the direction of said vane,
   corresponding indicia means related to said first-mentioned indicia means for rotating the casing to orient the casing relative to the direction of the vane so that when the casing is oriented relative to the direction of the vane, the compass needle will indicate the compass direction,
   means for rigidly fixing said vane on said base,
   a portion of said vane intermediate its ends being flexible so that said vane is flexed when moved in a direction at an angle to the direction of the wind and fixed relative thereto,
   and wind velocity indicia means on said base adapted to indicate the velocity of the wind depending on the flexing of the vane.

References Cited by the Examiner
UNITED STATES PATENTS

| 1,060,463 | 4/1913 | Lamant | 73—228 |
| 1,068,169 | 7/1913 | Ricketts | 73—188 |
| 2,491,176 | 12/1949 | Hammond | 73—189 |
| 2,749,751 | 6/1956 | Hastings | 73—189 |
| 2,889,707 | 6/1959 | Snider | 73—189 |

RICHARD C. QUEISSER, *Primary Examiner.*

ROBERT L. EVANS, DAVID SCHONBERG,
*Examiners.*